United States Patent
Podgorny et al.

(10) Patent No.: US 11,222,351 B2
(45) Date of Patent: *Jan. 11, 2022

(54) PREDICTING APPLICATION CONVERSION USING EYE TRACKING

(71) Applicant: INTUIT INC., Mountain View, CA (US)

(72) Inventors: Igor A. Podgorny, San Diego, CA (US); Benjamin Indyk, San Diego, CA (US); Michael J. Graves, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/207,851

(22) Filed: Mar. 22, 2021

(65) Prior Publication Data

US 2021/0209633 A1 Jul. 8, 2021

Related U.S. Application Data

(63) Continuation of application No. 15/667,920, filed on Aug. 3, 2017, now Pat. No. 10,990,996.

(51) Int. Cl.
*G06Q 30/02* (2012.01)
*H04L 29/08* (2006.01)
(Continued)

(52) U.S. Cl.
CPC ........ *G06Q 30/0218* (2013.01); *G06F 3/013* (2013.01); *G06K 9/00302* (2013.01); *H04L 67/22* (2013.01)

(58) Field of Classification Search
CPC ....... G06Q 30/0218; H04L 67/22; G06F 3/00; G06F 2203/011; G06F 3/011; G06K 9/00302
(Continued)

(56) References Cited

U.S. PATENT DOCUMENTS 8,386,966 B1 2/2013 Attinasi et al.
2007/0150393 A1 6/2007 Mathews et al.
(Continued)

FOREIGN PATENT DOCUMENTS

JP 2000020757 A * 1/2000 ........... H04N 13/194
JP 2000020757 A 1/2000

OTHER PUBLICATIONS

Jim Ross, Eyetracking: Is It Worth It, 2009 (Year: 2009).*

*Primary Examiner* — Tarek Elchanti
(74) *Attorney, Agent, or Firm* — Patterson & Sheridan, LLP

(57) ABSTRACT

Techniques are disclosed for determining application experience of a user. One embodiment presented herein includes a computer-implemented method, which includes receiving, at a computing device, eye tracking data of a user interacting with at least a first page of an application. The computer-implemented method further includes determining, based at least on the eye tracking data, at least a current user experience regarding the first page. The computer-implemented method further includes predicting, based on evaluating the current user experience, that the user is likely to discontinue use of the application. The computer-implemented method further includes determining, based at least on the prediction, an intervention that reduces a likelihood of the user discontinuing use of the application, and interacting with the user according to the intervention.

20 Claims, 8 Drawing Sheets

(51) Int. Cl.
*G06F 3/01* (2006.01)
*G06K 9/00* (2006.01)

(58) Field of Classification Search
USPC .......................................................... 705/14.2
See application file for complete search history.

(56) References Cited

U.S. PATENT DOCUMENTS

| | | |
|---|---|---|
| 2007/0244914 A1 | 10/2007 | Kreiner |
| 2013/0054622 A1 | 2/2013 | Karmarkar et al. |
| 2013/0179319 A1 | 7/2013 | Barker et al. |
| 2015/0269607 A1 | 9/2015 | Steube et al. |
| 2016/0027336 A1 | 1/2016 | Towers et al. |
| 2016/0128568 A1 | 5/2016 | Bellamy et al. |
| 2017/0090562 A1 | 3/2017 | Gustafsson et al. |
| 2017/0115742 A1 | 4/2017 | Xing et al. |
| 2017/0192983 A1 | 7/2017 | Weng et al. |

* cited by examiner

PREDICTING APPLICATION CONVERSION USING EYE TRACKING

CROSS REFERENCE TO RELATED APPLICATIONS

This Application is a continuation of and hereby claims priority under 35 U.S.C. § 120 to pending U.S. patent application Ser. No. 15/667,920, filed on Aug. 3, 2017, the contents of which are incorporated herein by reference in their entirety.

BACKGROUND

The present disclosure relates to techniques for determining a quality of user experience with an application, and more specifically, to techniques for reducing the likelihood of a user discontinuing use of an application based, at least in part, on eye tracking.

Complex software applications and services are frequently made available to users over computer networks, such as the Internet. For example, software applications used to prepare and file federal and state income tax returns are frequently offered as an online service. In addition to generating tax return documents, these online services typically guide a user through a collection of complex interactive workflows in order to prepare a complete, valid income tax return. Further, in attempt to increase user satisfaction with the application, these services generally attempt to maximize the user's tax refund, as the user's level of satisfaction is generally affected by refund amounts. For example, if a service indicates that the user has a negative refund (i.e., the user owes money to the IRS), this can lead to customer dissatisfaction with the online service and decrease customer retention and conversion (e.g., in the context of a try-before-you-by program, a customer may choose not to pay for the product after the trial).

Other online services allow users to access software applications to prepare a variety of other legal and formal documents. For instance, an example online service directs a user through a guided interaction to generate estate planning documents, corporate entity documents, legal filings, etc. Still other complex software applications accessed as an online service include financial service applications, which allow users to complete mortgage applications or apply for home, life, or automobile insurance.

In addition to these transactional online services, a variety of complex software tools offer users access to both online services and local client applications, e.g., financial accounting software, video editing or media composition software, software development tools, etc. Such applications may allow users to access application features and user data stored online, regardless of whether the application is installed locally or accessed as an online service. Once customer data is stored by a service provider, end users can access their data using a variety of clients, including a web browser that accesses a software application as a series of web pages, dedicated "thin" client applications, and so-called "apps" accessed using a mobile telephone or computing tablet.

Online services can monitor users' interaction by tracking amount of time spent by the user with the service, number of clicks from the user, duration of time spent viewing particular pages, etc. While this information regarding a user's interaction with services may be somewhat helpful in determining user satisfaction, there are limitations to the usefulness of the information. For example, while a user's inactivity may appear to indicate a likelihood of abandoning a service, the inactivity may in fact be unrelated to a user's satisfaction with the service (e.g., the user may be temporarily inactive for other reasons). As such, there is a need for additional objective indicators of a user's quality of experience in order to improve the accuracy of such determinations.

SUMMARY

One embodiment presented herein includes a computer-implemented method for determining application experience of a user. The method generally includes receiving, at a computing device, eye tracking data of a user interacting with at least a first page of an application. The method further includes determining, based at least on the eye tracking data, at least a current user experience regarding the first page. The method further includes predicting, based on evaluating the current user experience, that the user is likely to discontinue use of the application. The method further includes determining, based at least on the prediction, an intervention that reduces a likelihood of the user discontinuing use of the application. The method further includes interacting with the user according to the intervention.

Additional embodiments include a computing device having a processor and a memory storing one or more application programs configured to perform the methods disclosed herein and a computer-readable storage medium storing instructions, which when executed on a processor perform the methods disclosed herein.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. Note, however, that the appended drawings illustrate only exemplary embodiments and are therefore not to be considered limiting of the scope of the disclosure, for the disclosure may admit to other equally effective embodiments.

DETAILED DESCRIPTION

Figure 1:
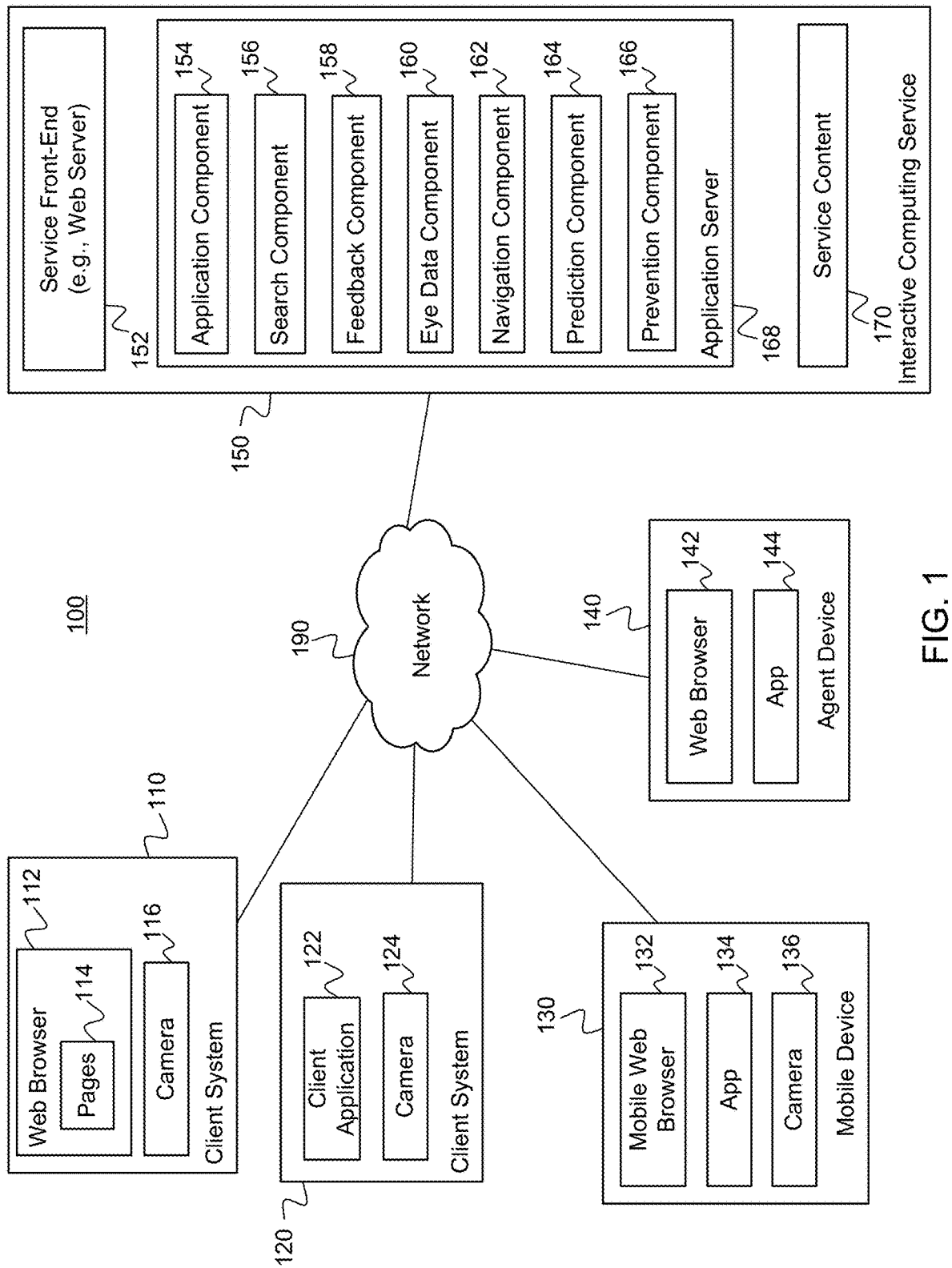
FIG. 1 illustrates an example of a computing environment used to provide an interactive computing service, according to one embodiment.

Embodiments presented herein provide techniques for determining application experience of a user based on eye tracking data of the user. More specifically, embodiments presented herein can determine the quality of an experience of the user regarding application content and intervene (e.g., to reduce the likelihood of the user discontinuing use of the application) if the determined experience satisfies any predefined intervention conditions.

For example, a user may interact with the software application using a computing device with an attached camera (e.g., a mobile phone with an embedded camera). The user may navigate between pages of the application and interact with items on the pages using one or more input devices (e.g., touch screen, mouse, keyboard, voice commands, etc.). In some embodiments, the application may be a financial services application (e.g., TurboTax Online, QuickBooks Online, and the like). Using the example of an online tax preparation service, a user can interact with an interactive workflow (provided by the online tax preparation service) to prepare and file a tax return, search self-support content (e.g., such as help content, guides, documentation, video and audio content, user-generated content, etc.), navigate the online tax preparation service, and the like. While the user interacts with the application, the application may use the camera associated with the user's computing device to capture movements and characteristics of the user's eyes (referred to as eye tracking data) in relation to the content displayed in the application.

Numerous studies have established the relationship between eye movements and higher cognitive processes. For example, pupil dilation may indicate interest or excitement, constituting an involuntary response to such interest or excitement at a subconscious level. A user's point of gaze on a screen may indicate the user's fixation on a particular issue, topic, or item. Furthermore, the duration and patterns of a user's saccadic eye movement (rapid movement of the eye between fixation points) may indicate such experiences as confusion and fatigue. As such, eye tracking data can identify changes in a user's emotion or behavior in relation to application content, particularly when calibrated to an individual user. This data along with other amalgamated user data (e.g., click or touch data, user profile information, etc.) can identify when an intervention may be beneficial and effective.

In some examples, the online service may analyze eye tracking data to infer a quality of experience of the user to the application. For example, as described below, the online service can use the eye tracking data of the user as a behavioral predictor for determining a likelihood of the user abandoning (or discontinuing use of) the application. Assume, for example, that a user is interacting with an interactive workflow provided by the online service to prepare and file a tax return. In this example, the online service can use a camera associated with the user's device to track the user's eye movements for one or more interactive screens of the workflow. In some cases, the online service may enable the tracking of the user's eye movements for only certain interactive screens. For example, the online service may designate certain interactive screens as more important (e.g., such as a welcome page, data import page, deduction page, product payment page, etc.) than other interactive screens, and therefore may consider the eye movements of the user determined for such screens as more reliable predictors of the user's behavior. In some cases, the online service may enable the tracking of the user eye movements for each interactive screen.

In some examples, the online service analyzes eye tracking data to identify such indicators as pupil dilation, point of gaze, and saccadic movement as the user interacts with one or more interactive screens. Changes in eye movements between interactive screens are also identified (e.g., a user's pupils may dilate less frequently while looking at one interactive screen than another). In some embodiments, a baseline is established for a user before the eye tracking data is analyzed to make further determinations. For example, the online service may determine, during the user's first one or more interactions with the application, that the user generally exhibits a certain frequency of pupil dilations, a certain frequency and duration of saccades, and certain points of gaze during a session. This baseline information may be used to calibrate the system for the user so that determinations based on eye tracking data are more accurate.

Once the user reaches a predetermined point in the application, the online service may determine a likelihood of the user abandoning the service based on the user's experience determined (based on eye tracking data) for the interactive screens the user previously interacted with. For example, as described below, using one or more analytical models (e.g., such as a propensity model), the online service can compute a score indicating the probability of the user to abandon the service based on the user's experience associated with the interactive screens. If the online service determines the probability satisfies a predetermined condition (e.g., exceeds a threshold), the online service can determine that there is a high likelihood that the user may abandon the service (e.g., by not paying for application content and/or services provided by the online service). In addition, the online service can predict based on the user experience a measure of customer retention (e.g., whether the customer is going to use the service at a later point in time).

In addition to the user experience (determined from eye tracking data), the online service can also track other user behavioral predictors, examples of which include, but are not limited to, a count of user clicks or touches for each interactive screen, ratio of unique page clicks or touches to total page clicks or touches, amount of time spent for each interactive screen, feedback from the user, relationship of user to the application (e.g., new user, existing user, etc.), user profile information (e.g., age, gender, address, income, etc.), and the like. However, compared to these conventional behavioral and demographic predictors, the information determined from eye tracking data can provide a more accurate measure of a user's experience with respect to application content. For example, while it may be possible in some cases to infer some degree of user experience based on the number of clicks for each interactive screen, using eye tracking data to determine user experience for each interactive screen may provide a more accurate measure of the user's experience with regard to application content than the actual number of clicks received from the user, as eye movements may comprise an involuntary response to a user's experience.

For example, assume that an online tax-preparation service determines a user provided a low number of clicks (e.g., the number of clicks are below a threshold) for one or more interactive screens of a tax preparation workflow provided by the service. In such a case, the online service may infer from the low number of clicks, that the user has a high level of satisfaction with the application (e.g., the user is experienced with features of the application, is not dissatisfied with content of the application, etc.). At the same time, assume that for at least some of the interactive screens, the user exhibited infrequent pupil dilations and irregular saccadic movement which may indicate disinterest, confusion, or fatigue that is not detectable by the number of clicks received from the user (or other behavioral predictors) alone. As such, by determining an experience of the user regarding the content of the application based on eye tracking data, the online service may more accurately determine probability of the user to abandon the service. In some examples, however, the online service may use these conventional behavioral predictors in addition to the eye tracking data to determine probability of the user to abandon the application.

In some examples, once the online service determines that the probability of the user to abandon the online service exceeds a threshold, the online service may take proactive steps to reduce the likelihood of the user abandoning the service. For example, in some cases, the online service can intervene while the user is interacting with the application (e.g., in real-time) by offering the user a discount or other monetary incentive, offering assisted support to the user (e.g., via links for chat sessions, telephone numbers, etc.), displaying a list of content items to help the user, and the like. In some cases, the online service may intervene after the user has finished interacting with the application (e.g., off-line), such as by contacting the user via e-mail at a later time.

In some examples, the online service can also determine a type of intervention to use based on the user experience (determined from eye tracking data and other information) to reduce the likelihood of the user abandoning the service. For example, the online service can use a second analytical model to determine the type of intervention for a given user that produces the greatest likelihood that the user will not abandon the service. As described below, the second analytical model may be an uplift model that uses the probability score of the user to abandon in addition to one or more attributes of the user (e.g., user experience, age, gender, particular points of gaze, etc.) to determine the type of intervention to apply to the user.

In some embodiments, the user's eye movements are also captured as one or more interventions are presented to the user to determine the user's experience of the interventions. For example, eye tracking data may indicate that a user responded positively (e.g., based on pupil dilation, point of gaze, etc.) to a particular type of intervention. This information is then used by the second analytical model in the future to determine the most effective type of intervention for the user (and other users) in a particular situation. In some embodiments, if eye tracking data indicates that a user is not interested in a particular intervention, a different type of intervention may be tried instead. Eye tracking data provides useful insight into a user's experience of interventions, and thereby allows for interventions to be improved in ways that were not previously possible.

Advantageously, by monitoring users' eye tracking data while the users interact with the online service and determining the experience of the users regarding application content, embodiments herein can leverage emerging computing technologies in order to improve existing techniques for identifying the users that are at risk of abandoning the online service and proactively intervening to reduce the likelihood of those users discontinuing use of the service. In this manner, the techniques presented herein can improve the functioning of an online service and increase the retention of customers of the online service.

Note, certain embodiments are described herein using an online tax-preparation service as an example of computer software and an online software service, etc., that predicts a user's application experience based on eye tracking data. One of ordinary skill in the art will recognize that the techniques described herein may be adapted for use by a broad variety of software applications, online or web services, software features, or support services where users' eye movements can be captured (e.g., by a camera). Additionally, it should be noted that although, in certain examples described herein, particular computing devices are described as performing certain tasks (e.g., capturing eye tracking data, analyzing eye tracking data, making determinations, providing interventions, etc.), such tasks may be performed by one or more additional computing devices (e.g., connected via a wired or wireless network).

FIG. 1 illustrates an example of a computing environment 100 used to provide an interactive computing service 150, according to one embodiment. As shown, the computing environment 100 includes client systems 110 and 120, a mobile device 130, an agent device 140, and an interactive computing service 150, which are each connected to a network 190. The network 190, in general, may be a wide area network (WAN), local area network (LAN), wireless LAN (WLAN), personal area network (PAN), a cellular network, etc. In a particular embodiment, the network 190 is the Internet.

Client systems 110 and 120 are included to be representative of a general purpose computing systems, such as a desktop or laptop computer hosting applications used to access the interactive computing service 150. For example, client system 110 includes web browser 112 used to access the interactive computing service 150 by rendering web pages 114 received from the interactive computing service 150. Similarly, client system 120 includes a client application 122. The client application 122 is included to be representative of a component of a client server application (or other distributed application) which can communicate with the interactive computing service 150 over network 190. Client application 122 may be a "thin" client where the processing is largely directed by the client application 122, but performed by computing systems of the interactive computing service 150 or a conventional software application installed on client system 120. Mobile device 130 is included to be representative of a variety of computing devices, such as a mobile telephone or computing tablet. As shown, the mobile device 130 may access the interactive computing service 150 over network 190 using a mobile web browser 132 or local application or "app" 134 executed on the mobile device 130. Client systems 110 and 120 and mobile device 130 further include associated cameras 116, 124, and 136, which may be used to capture eye tracking data of users accessing the interactive computing service 150 through the devices. Agent device 140 is included to be representative of a variety of computing devices, such as a desktop, mobile telephone, computing tablet, laptop, etc. Agent device 140 may access the interactive computing service 150 over network 190 using web browser 142 or "app" 144 executed on the agent device 140.

In one embodiment, web browsers 112, 132, 142, and applications 122, 134, 144 communicate with the interactive computing service 150. For example, referring to client systems 110, 120 and mobile device 130, in the case where interactive computing service 150 offers a tax-preparation service, web browsers 112, 132, client application 122, and application 134 may provide software which guides a user through preparing a tax return as well as provide the user with access to a variety of related features (e.g., self-support content, assisted support content, etc.) available from the interactive computing service 150. Continuing with the tax preparation example, such features may include the ability to file a prepared return via an interactive workflow, to search for help content, user generated content, etc. related to tax topics, to post questions and answers to questions about the service using an online community, or to provide feedback about the usefulness, quality or relevance of content provided by the interactive application or members of the online community. As described herein, in some embodiments, eye tracking data (e.g., captured using cameras 116, 124, and 136) of a user may be used to determine the experience of the user regarding the interactive computing service 150.

Referring to agent device 140, web browser 142 and application 144 may provide software, which allows a support agent to provide support or assist users with accomplishing a particular task. For example, a support agent can use web browser 142 and/or application 144 to access features or content of the interactive computing service 150 that may not be available to users to provide support to users. Such features, for example, may include detailed product documentation, access to user accounts for the online service, etc. In some embodiments, applications 122, 134, and 144 may support screen sharing (e.g., as one type of assisted support). For example, with screen sharing, the support agent can use application 144 to observe and control application 122 on client system 120, application 134 on mobile device 134, etc.

As shown, the interactive computing service 150 includes a service front-end 152, an application server 168, and a service content database 170. In this example, the interactive computing service 150 is generally modeled as a web server (i.e., service front end 152), an application server 168, and a database (i.e., service content database 170). Of course, other software architectures or distributed application frameworks could be used. Service front-end 152 and application server 168 are included to be representative of physical computing systems, as well as representative of virtual machine instances deployed to a computing cloud. Service front end 152 may communicate with application server 168 to respond to requests from applications on client systems 110, 120, mobile device 130, and agent device 140.

The application server 168 includes an application component 154, search component 156, feedback component 158, eye data component 160, navigation component 162, prediction component 164 and prevention component 166. Continuing with the example of a tax preparation service, the application component 154 may provide one or more software applications, which are used to guide a user in preparing a tax return and to access related features and services, e.g., to interact with self-support content or assisted support content. In one embodiment, the application component 154 may respond to requests from clients by generating hypertext markup language (HTML) and related content passed to clients (via the service front-end 152) and rendered as a user interface (e.g., forms, text fields, and so on, along with scripts or applets executed by a web browser). In some cases, the application component 154 may interact with other components of the application server 168 (e.g., such as prediction component 166) to pass HTML content to clients. In some cases, the application 122 running on the client 120, the application 134 running on the mobile device 130 and/or the application 144 running on agent device 140 could generate information content to present data retrieved from the application server 168. In general, the application component 154 may be implemented using any suitable software programming language, application framework, web service solution stack, virtual application containers, etc., in order to present application features and content to a client.

In some embodiments, the application server 168 may include one or more graphical user interface (GUI) components that interactive computing service 150 can present on client systems 110, 120, mobile device 130, and agent device 140, based on whether a user is interacting with a workflow (via application component 154), searching for information content (e.g., via search component 156), providing feedback for information content (e.g., via feedback component 158), etc. The GUI components may include, for example, HTML, components or code that generates HTML components that can be passed to client systems 110, 120, mobile device 130 and agent device 140 and rendered as a user interface. The GUI components may additionally include instructions executable by client systems or mobile devices to display a user interface. The GUI components may additionally include instructions executable by client systems 110, 120, mobile device 130 and agent device 140 to display a user interface using language-specific or operating system-specific GUI components (e.g., instructions for displaying Win32 forms or similar components on other operating system platforms, Abstract Window Toolkit or Swing API components on the Java platform, and so on). Generally, instructions capable of rendering a GUI on client systems 110, 120, mobile device 130 and agent device 140 may include computer executable code generated from compiling and/or interpreting C (or variants thereof), Java, PHP, Ruby, HTML, JavaScript, Python, AJAX, VBscript, and other programming or scripting languages used to compose and present a GUI. In an example tax preparation application, application server 168 components may include screens for prompting a user for personal information (e.g., name, address, social security number), income information (from W-2s, 1099s, K-1s, and so on), and various deductions and credits that the user may qualify for, structured feedback (e.g., up-down votes, star ratings, etc.), voice-of-customer feedback, etc. The prompts may be for input of such information via voice/speech of the user. Additionally, the application server 168 components may include prompts (e.g., pop-ups or other interventions) that display application content (e.g., generated by prediction component 164) to reduce the likelihood of the user abandoning the interactive computing service 150.

The eye data component 160 may receive eye tracking data from client systems 110 and 120 and mobile device 130, captured by cameras 116, 124, and 136. Eye data component 160 may use received eye tracking data of a user to determine an experience of the user regarding service content. For example, eye data component 160 may analyze the eye tracking data to identify objective indicators of the user's experience, such as pupil dilation, point of gaze, and saccadic movement, relative to the service content being displayed to the user. In some embodiments, eye data component 160 is initially calibrated for a particular user by collecting baseline information regarding the user's eye movements while interacting with the interactive computing service 150. Baseline information may comprise eye tracking data from the user's first one or more sessions of accessing the interactive computing service 150. Subsequently, the user's baseline information may be used by eye data component 160 to further improve the accuracy of determining the user's experience based on eye tracking data.

Eye data component 160 may continuously monitor a user's eye tracking data as the user accesses the interactive computing service 150 (or, in some embodiments, only when the user accesses certain interactive screens deemed to be particularly important), and analyze this data. A user's pupil dilation may indicate interest or excitement, and so eye data component 160 may associate dilation in eye tracking data with user interest or excitement. When combined with a user's point of gaze, pupil dilation may indicate excitement or interest regarding a particular issue, topic, or item displayed on the screen. Furthermore, eye data component 160 may analyze the user's saccadic movement in order to identify potential experiences such as confusion or fatigue. For example, eye data component 160 may associate significant changes in saccadic movement (e.g., if the duration and/or patterns of a user's saccadic movement departs from the user's baseline behavior to a threshold extent) with confusion or exhaustion. In some embodiments, all of these indicators (e.g., pupil dilation, point of gaze, and saccadic movement) may be considered in combination to identify the user's experience. Each indicator may be assigned a relative score in a determination of a user experience (e.g., based on the relative significance of the indicators). For example, pupil dilation may be weighted more heavily than saccadic movement. Eye data component 160 may provide user experience information, once determined based on eye tracking data, to prediction component 164.

In some embodiments, eye data component 160 also received eye tracking data of the user when interventions are provided to the user to determine the user's experience with respect to the interventions. For example, eye data component 160 may analyze the eye tracking data to determine if an intervention which offers a discount was interesting to the user (e.g., based on pupil dilation and point of gaze). If eye data component 160 determines that the user was or was not interested in the intervention (e.g., if the user did not focus on the intervention, did not exhibit pupil dilation, and/or exhibited increased saccadic movement indicating exhaustion or confusion), eye data component 160 may provide this user experience information to prediction component 164 in order to inform future decisions (e.g., to immediately provide additional interventions or to avoid this type of intervention in similar situations in the future).

The search component 156 allows users to search for content items or features available from the interactive computing service 150. For example, the search component 156 may evaluate service content database 170 to identify content items responsive to a user query. In such a case, the search component 156 could identify a variety of content items or services hosted on the interactive computing service 150, such as user guides, feature documentation, as well as user generated content such as questions posted to an online community of users, user blogs, or syndicated forum posts, etc. and/or identify other actions to take, such as routing a user to assisted support, routing a user to receive feedback from the user, etc. In some cases, the search component 156 may use keywords specified in the user query to identify content hosted on the interactive computing service 150. For example, assume a user specifies keywords "tax return" in a search for how to prepare a tax return. In response, the search component 156 may identify content items in the server content database 170 that include the keywords "tax return" specified by the user.

The feedback component 158 may be used to capture feedback regarding user experience. For example, a user interacting with the online service may at times be prompted to provide feedback regarding the usefulness of certain features and/or content provided by the online service. Such feedback may be provided in the form of structured feedback (e.g., binary up/down votes, star ratings, etc.), more detailed unstructured feedback (e.g., user comments, voice/speech, etc.), or in general any other form that indicates whether the user was satisfied or dissatisfied with the online service. As described below, the prediction component 164 may use such feedback in addition to the user experience (determined from eye tracking data) to determine the user's probability to abandon the interactive computing service 150 and/or determine the set of interventions to use to reduce likelihood of the user to abandon the interactive computing service 150.

The navigation component 162 may be used to track behavior of the user while the user is interacting with the interactive computing service 150. For example, the navigation component 162 may monitor, for each interactive screen visited by the user, the number of clicks and/or touches for the interactive screen (e.g., by monitoring input devices for user input), the amount of time spent on each interactive screen (e.g., by initiating and maintaining timers), whether the user provided feedback for the interactive screen, etc. The navigation component 162 may store the user activity indicators in a database (e.g., in interactive computing service 150) for use by other components of the service 150 (e.g., such as prediction component 164).

The prediction component 164 may be used to predict likelihood of the user to abandon the application given the user's experience or sentiment with respect to particular application content. The prediction component 164 may receive (from the eye data component 160) an array of user experience information determined from eye tracking data for a number of interactive screens and use a first predictive model to compute a user abandonment score based on the array of user experience information from each interactive screen. The user abandonment score may indicate a likelihood (or probability) of the user to abandon or discontinue use of the application (e.g., by not paying for the application). As described below with respect to FIG. 3, in some embodiments, the first predictive model may be a propensity model that predicts the probability of the user to abandon the interactive computing service 150.

In one embodiment, the prediction component 164 may compute the user abandonment score at a designated interactive screen provided by the interactive computing service 150. For example, assuming the user is progressing through an interactive workflow to prepare a tax return, such a designated screen may be the page of the tax-preparation service where the user decides whether to pay for the service 150 (e.g., the print-file screen of the tax-preparation service). In another example, the designated screen may correspond to other pages of the tax preparation service (e.g., such as the welcome screen, data import screen, tax deduction screen, etc.).

In one embodiment, the prediction component 164 may compute the user abandonment score at an initial interactive screen, and continually update the abandonment score while the user interacts with the interactive computing service 150. If the prediction component 164 determines, for any given interactive screen, that the abandonment score exceeds a threshold (indicating the user is at risk of abandoning the application), the prediction component 164 can interact with the prevention component 166 to prevent the user from abandoning the application.

In cases where the prediction component 164 determines the user abandonment score is above a predetermined threshold, the prediction component 164 can determine one or more interventions to use to reduce the likelihood of the user abandoning use of the interactive computing service 150. For example, the prediction component 164 can use a second predictive model to determine a type of intervention to apply to the user. Such interventions can include offering the user the ability call customer service, offering the user the option for a support agent to control the user's device to aid the user in solving a problem, providing search results to the user (e.g., before the user searches for them), providing the user a help article, providing the user a set of help articles (e.g., with a link and the ability to search the help articles), making certain application content more prominent on the user's interface, offering a discount to the user, etc.

To determine the type of intervention, the prediction component 164 may use the second predictive model to evaluate the array of user experience information (per interactive screen), the user abandonment score, other user attributes (e.g., such as age, gender, occupation, location, etc.), user feedback, user activity indicators (e.g., number of clicks or touches per screen, etc.), etc. As noted, the second predictive model may be an uplift model (or incremental response model) that predicts the likelihood that an individual behavior will be influence by a stimulus, intervention, or treatment to a particular user attribute (e.g., such as user experience).

In some examples, the prediction component 164 can use the second predictive model to determine when to intervene with a user interacting with the application, based on the user experience (determined from the eye tracking data). For example, in cases where a user visits a large number of interactive screens provided by the interactive computing service 150, the prediction component 164 may weight the experience determined for the user for certain screens differently compared with other screens. For example, for an online tax preparation service, the prediction component 164 may weight experience determined from the welcome screen, import data screens, print/file screen, etc. higher than experience determined from other screens provided by the online tax preparation service.

In addition, the prediction component 164 may use the second predictive model to determine a level of intervention to use for a user interacting with the online service, based on the user experience (determined from the eye tracking data). For example, based on the user experience and other user attributes, different types of interventions may be sufficient to reduce the likelihood of the user abandoning the interactive computing service 150. Assuming, for example, that the prediction component 164 determines both that offering the user a discount and offering the user assisted support with a particular feature may reduce the likelihood of the user abandoning the service, the prediction component 164 may choose to offer the user a discount (e.g., as opposed to offering the user assisted support). In some embodiments, the prediction component 164 can make such a determination based on a cost of the type of intervention. Continuing with the above example, the prediction component 164 may choose to offer the discount because it may be less expensive than offering the user assisted support. In another example, assuming the prediction component 164 determines to offer the user help as a type of intervention, the prediction component 164 may determine the level of help to provide based on the cost of the help (e.g., a phone call with a support agent may be more expensive than a chat session with a support agent, which may be more expensive than a direct link to self-support content, and so on). Once the prediction component 164 determines a set of interventions, the prediction component 164 can provide the interventions to the prevention component 166.

In some embodiments, prediction component 164 further bases its determinations on user experience information regarding previous interventions. For example, eye data component 160 may receive and analyze eye tracking data of a user as interventions are provided, as described above, in order to determine the user's experience with respect to the interventions. This user experience information may be provided to prediction component 164 in order to inform future determinations. For example, if a first intervention did result in a positive user experience (determined based on eye tracking data), prediction component 164 may determine that an additional intervention should be provided. Furthermore, if a particular type of intervention was successful in a similar situation in the past (e.g., an offer of a discount resulted in a fixed point of gaze and pupil dilation for a user previously exhibiting a high probability of abandonment), this may inform the determination made by prediction component 164 of which intervention to provide in the present situation.

The prevention component 166 may be used to intervene with the user that is interacting with the application. As noted, the prevention component 166 may use the set of interventions (received from the prediction component 164) to reduce the likelihood of the user abandoning the service. In one embodiment, the prevention component 166 can intervene in real-time (e.g., while the user is interacting with the interactive computing service 150). In one embodiment, the prevention component 166 can intervene at a later time (e.g., the next day, next week, etc.) by contacting the user via e-mail, phone, etc. The determination regarding whether to intervene in real-time or at a later time may be based, for example, on the probability of abandonment (e.g., if the probability of abandonment is above a threshold, real-time intervention is chosen, while if it is below the threshold, intervention at a later time is chosen).

Based on the intervention, the prevention component 166 can prompt the user (e.g., via an icon, button text, panel, etc.) with application content, features and/or services provided by the interactive computing service 150. For example, if the intervention is a discount, the prevention component 166 can prompt the user via a pop-up message with text offering the user a discount. If the intervention is offering the user assisted support, the prevention component 166 can produce a help panel on the user's interface that shows a phone number, chat message, etc. The prevention component 166 can interact with one or more components of the application server 168 (e.g., application component 154) and/or web server 152 to modify and alter application content on the user's interface.

Figure 2:
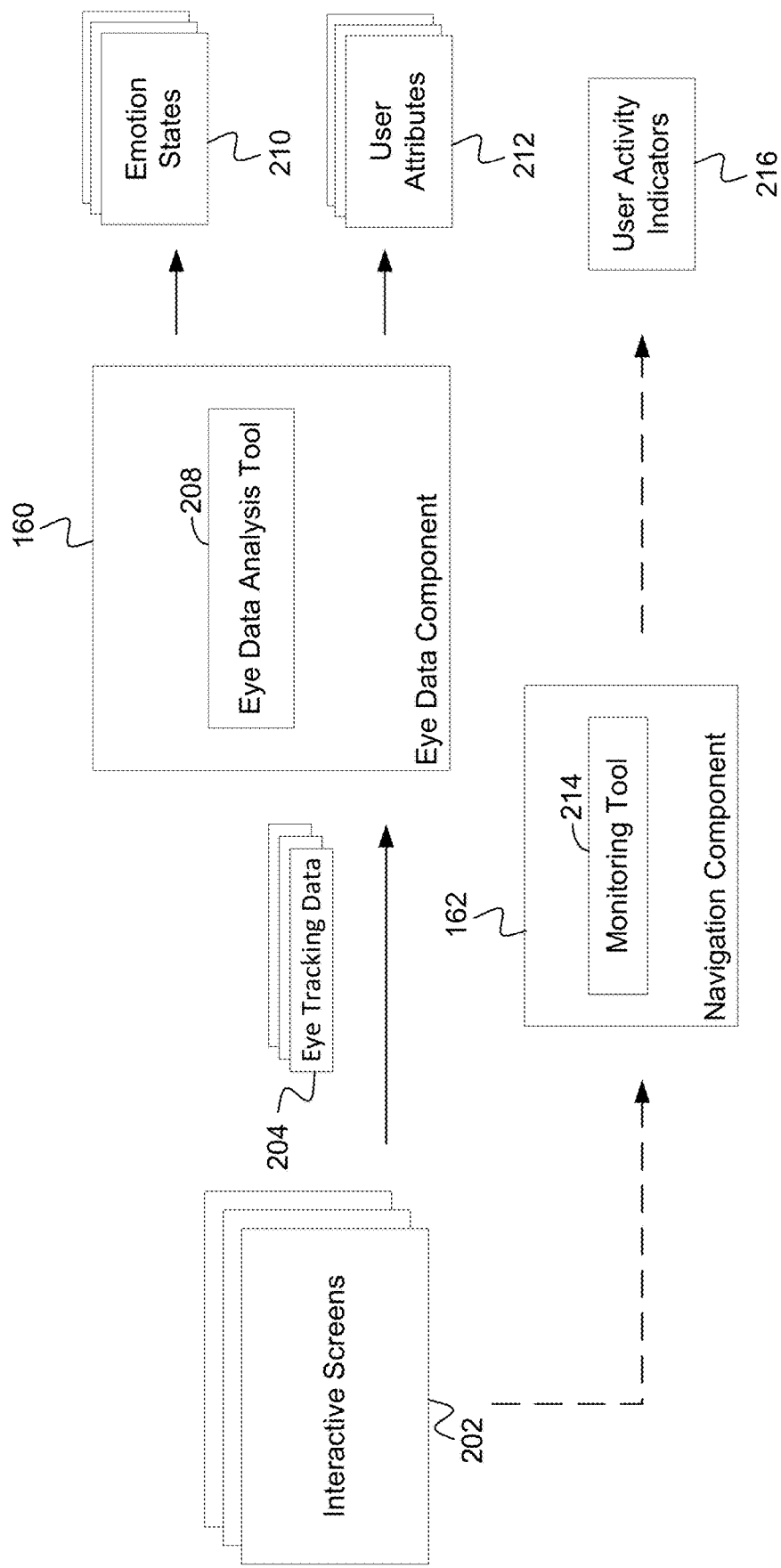
FIG. 2 illustrates components of the interactive computing service used to determine attributes of a user based on eye tracking data, according to one embodiment.

FIG. 2 further illustrates the eye data component 160 and navigation component 162 described relative to FIG. 1, according to one embodiment. As shown, the eye data component 160 includes an eye data analysis tool 208. The eye data component 160 may track the eye movements of a user (e.g., based on eye tracking data 204 captured using a camera associated with the user's device) interacting with one or more interactive screens 202 provided by the interactive computing service 150. Assuming interactive screens 202 are associated with a tax preparation workflow, eye tracking data 204 may comprise the user's eye movements (e.g., captured as video, photos, descriptive text, etc.) as the user navigates through interactive screens associated with tax preparation.

The eye data component 160 can use eye data analysis tool 208 to predict one or more attributes and/or sentiments comprising a user experience based on the eye tracking data 204. For example, as shown, the eye data component 160 can determine an array of measures of user emotional states 210 for each interactive screen (e.g., one or more emotional states per screen or item on a screen) and/or other user attributes 212 (e.g., age, gender, etc.) based on the eye tracking data 204. For the purpose of efficiency, emotion states 210 and/or user attributes 212 may be referred to individually or collectively as user experience information. In one example, the eye data component 160 may determine each emotional state as a score with a value ranging between −1 to 1, where 1 is associated with high positive emotional state and −1 is associated with a negative emotional state. For example, frequent pupil dilation, appropriate points of gaze (e.g., directed toward relevant locations on the screen), and infrequent saccadic movement may result in an emotional state score close to 1, indicating interest or excitement. Infrequent pupil dilation, irregular points of gaze, and irregular saccadic movement may result in an emotional state score close to −1, indicating disinterest, confusion, or exhaustion. In general, however, the eye data component 160 can use any other suitable range of scores, e.g., 0 to 10, 1 to 100, and so on. In alternative embodiments, user experience information may be generated and communicated in a form other that of numerical scores, such as descriptive text.

In addition to tracking user sentiment/emotion, the interactive computing service 150 can use the navigation component 162 to track other activity of the user for each interactive screen 202. For example, the navigation component 162 includes monitoring tool 214, which can track user activity indicators 216, such as the number of clicks or touches for each interactive screen, ratio of unique page clicks or touches to total page clicks or touches, amount of time spent for each interactive screen, etc. The navigation component 162 may store the user activity indicators 216 (e.g., in a database) for use by other components of the interactive computing service 150.

Figure 3:
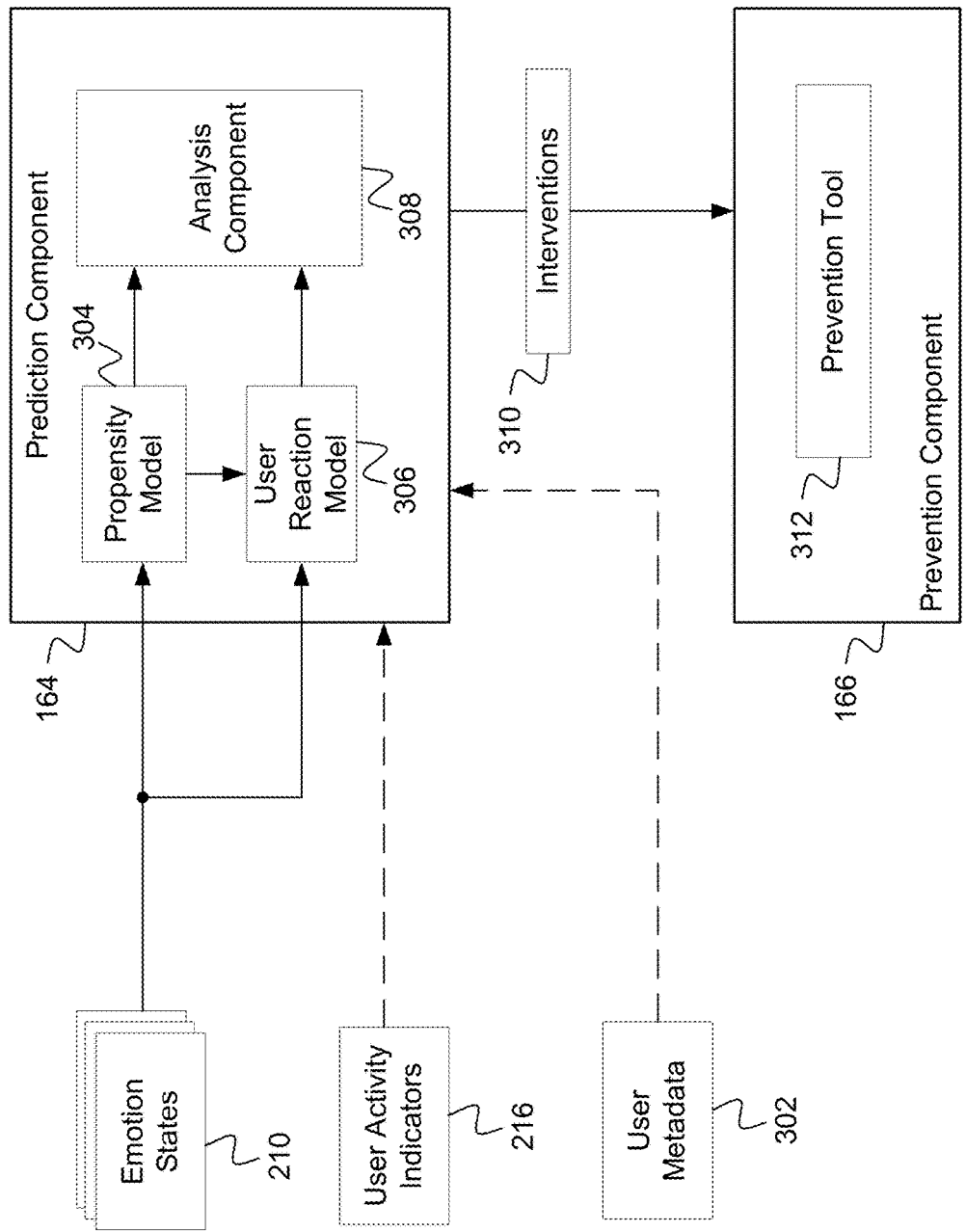
FIG. 3 illustrates components of the interactive computing service used to determine likelihood of the user to abandon the interactive computing service and determine one or more interventions to prevent the user from abandoning the interactive computing service, according to one embodiment.

FIG. 3 further illustrates the prediction component 164 and the prevention component 166, described relative to FIG. 1, according to one embodiment. As shown, the prediction component 164 includes propensity model 304, user reaction model 306 and analysis component 308. The prediction component 164 receives the array of sentiment (or emotion states) 210 for each interactive screen (e.g., from speech component 160), user activity indicators 216 (e.g., from navigation component 162) and/or user metadata 302.

User metadata 302 may include other attributes, such as age, gender, occupation, how long the user has been using the application, etc. User metadata 302 may include user attributes 212 from FIG. 2. Further, some of the user metadata 302 may be determined from the user's previous interaction with the interactive computing service 150 (e.g., the user may have provided personal information, employment information, location information, and other details to the interactive computing service 150 during the current interaction and/or prior interaction).

In some cases, some of the user metadata 302 may be determined from a profile of the user stored in a database hosted by the interactive computing service 150. In one embodiment, the user profile may be "unified" user profile maintained by the interactive computing service for different applications hosted by the interactive computing service 150. For example, the interactive computing service 150 could provide financial service applications, tax preparation applications, data management applications, etc., and a user may have a single profile that is associated with the different applications. In one embodiment, user metadata 302 can also include feedback (e.g., structured and/or unstructured feedback) received from the user.

In response to receiving the user's emotional states 210 (either alone or in addition to user activity indicators 216 and user metadata 302), the analysis component 308 can evaluate the received information with propensity model 304 to determine a user abandonment score that indicates probability of the user to abandon the interactive computing service 150. The propensity model 304 may have been trained over historical user data, including historical user sentiment data and historical user actions (e.g., whether the users adopted the application, discontinued use of the application, used technical support, etc.). For example, to obtain the historical data, the interactive computing service 150 can track interactions between a random set of users and the application for a period of time to collect sentiment and information associated with the use of the application.

Once collected, the interactive computing service 150 can train the model with the historical data using one or more techniques such as regression, logistic regression, decision trees, artificial neural networks, support vector machines, linear regression, nearest neighbor methods, distance based methods, naïve Bayes, linear discriminant analysis, k-nearest neighbor algorithm, etc. Such techniques may be used to identify correlations or other mathematical, statistical, or logical relationships between actions of a user (e.g., discontinued use) and sentiment of the user for different interactive screens. Assume, for example, that upon evaluating the historical data with one or more of the above techniques, it is determined that, at a particular interactive screen (e.g., data-import screen) provided by the service, a large number of users expressed a particular sentiment (e.g., confusion or exhaustion) above a threshold. Further, assume that it is at this particular sentiment threshold that users from the historical data set began to abandon the service. In this reference example, the above correlation between the frustration level on the data-import screen expressed by users and those users' subsequent abandonment can be used to train the propensity model 304 to predict other similar situations. Note, that the training of the propensity model 304 may also account for the importance of the interactive screens (e.g., different weights may be given to different pages of the online service), type of user (e.g., based on one or more user attributes), whether the user is an experienced user of the online service, etc.

The abandonment score obtained from the propensity model 304 in addition to emotional states 210 can be input to a user reaction model 306. For example, the analysis component 308 may evaluate the information with the user reaction model 306 to determine a type of intervention(s) 310 (e.g., when to intervene and how to intervene) for the user. In one embodiment, the user reaction model 306 is an uplift model (or incremental response model) that is used to predict (based on the user abandonment score, emotion states 210, user activity indicators 216, user metadata 302, and/or user reactions to previous interventions) a set of interventions that reduce the likelihood of the user abandoning the interactive computing service 150.

The uplift model 306 may have been trained over a historical data set that includes historical interventions used for users and the users' response to the interventions. In some embodiments, the uplift model 306 is further trained based on the eye tracking data collected during interventions. In one embodiment, the historical data set for training of the uplift model 306 may be obtained from the historical data set used to train the propensity model 304. For example, the interactive computing service 150 can perform marketing interventions on users in the historical data set that interact with a designated page (e.g., print-file page) to generate a training data set that includes the reaction of the users (given the users' sentiment to prior interactive screens provided by the interactive computing service 150, and based on eye tracking data) to the interventions. Once obtained, the interactive computing service 150 can use one or more of the above techniques (e.g., used for the propensity model 304) to identify correlations or other mathematical, statistical, or logical relationships between actions of a user (e.g., adoption, discontinued use, etc.) on a given interactive screen and sentiment of the user determined for different interactive screens the user interacted with.

Once the prediction component 164 determines interventions 310, the prediction component 164 provides the interventions 310 to the prevention component 166. The prevention component 166 includes prevention tool 312, which is configured to select and present information content on the user's interface (e.g., for client systems 110, 120, mobile device 130, etc.). For example, the prevention component 166 can provide prompts or modify user interfaces based on the interventions 310. In one embodiment, the prevention component 166 may intervene with the user (e.g., in real-time) during the user's interaction with the interactive computing service 150. In one embodiment, the prevention component 166 may intervene with the user (e.g., off-line) after the user is done interacting with the interacting computing service 150. For example, the prevention component 166 can offer the user a discount or coupon for a future interaction with the interactive computing service 150, via e-mail, telephone, etc.

Advantageously, the techniques presented herein can more accurately detect (e.g., compared to conventional methods) when a user is at-risk of abandoning the interactive computing service, and proactively intervene to reduce the likelihood of the user abandoning the interactive computing service.

Figure 4:
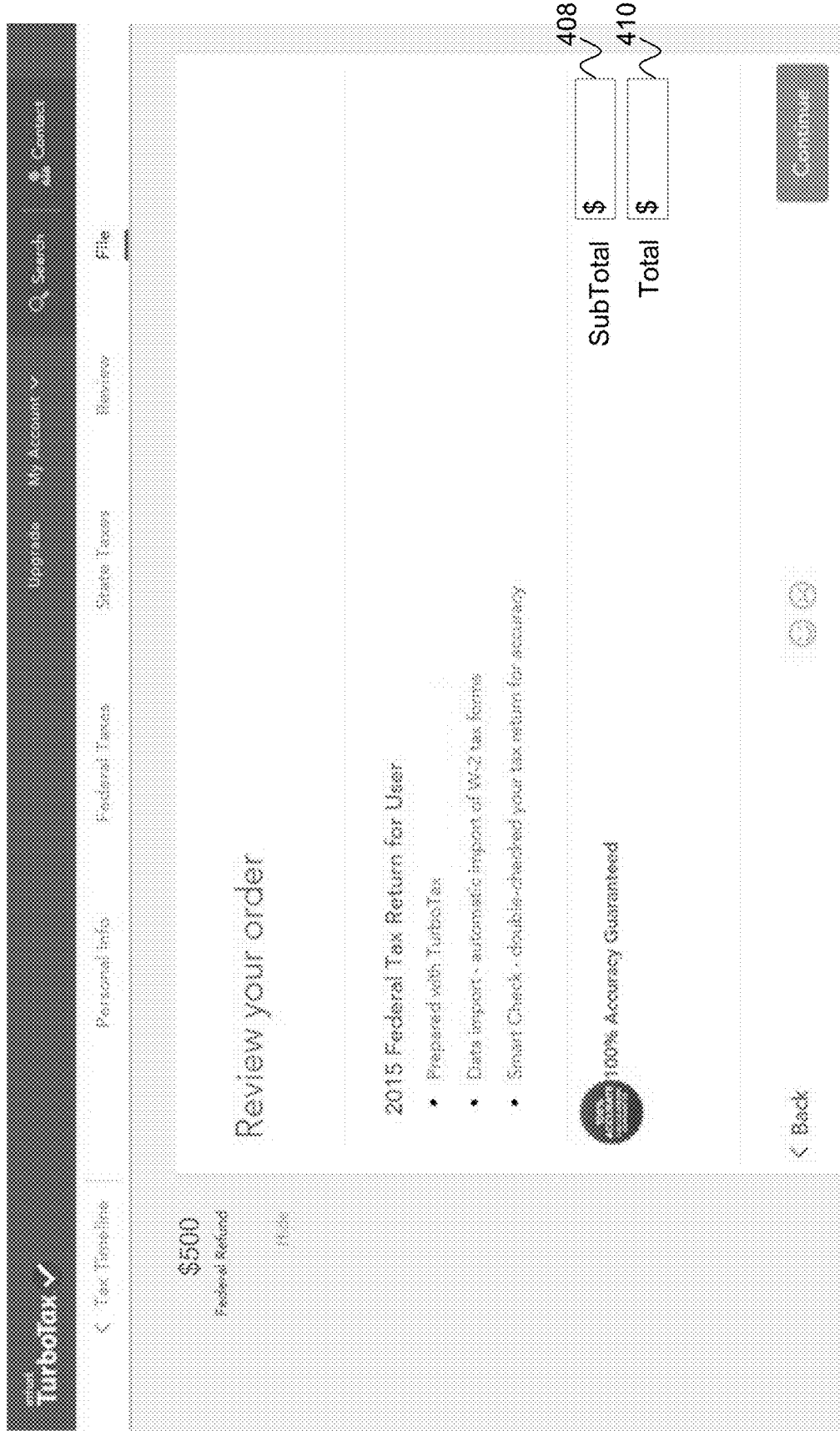
FIG. 4 illustrates an example interactive screen of an interactive workflow provided by the interactive computing service, according to one embodiment.

FIG. 4 illustrates an example interactive screen associated with an interactive workflow that allows a user to interact with interactive computing service 150. In one embodiment, the screen shown in FIG. 4 may be a designated page that the software application computes the user's likelihood to abandon the application (e.g., based on the user's experience of this screen and previous screens). For example, as discussed above, for each interactive screen that the user interacts with, the software application can capture eye tracking data and determine the user's experience regarding application content for the particular interactive screen. Referring to FIG. 4, the user may reach this screen after navigating through a series of screens related to the preparation of a tax return. In such a case, when the user reaches the screen shown in FIG. 4, for example, where the user has to decide whether to pay for services and/or features provided by the software application (indicated by boxes 408 and 410), the software application may determine to intervene if the user's abandonment score determined from the user's experience from the interactive screens satisfies a predetermined condition for intervening (e.g., is above a threshold).

As noted, in some embodiments, the software application can track the change in user experience (based on eye tracking data) for the screens leading up to the screen in FIG. 4, and use the change in experience as a predictor of the user's experience with the software application. For example, if the user has a positive experience for the previous screens, and the user's experience changes to negative for the screen in FIG. 4 (e.g., less frequent pupil dilation, increased saccadic movement, etc.), the software application may predict that the user is having a negative experience, notwithstanding the positive experience associated with the previous interactive screens. In some cases, for example, the software application may consider the interactive screen that indicates the user's tax refund (e.g., FIG. 4) as more important than other interactive screens. Thus, the software application may give a higher weight to the experience determined from eye tracking data of the user interacting with this screen when predicting the likelihood of the user to abandon the application. In some embodiments, the user's point of gaze may be used to determine the particular cause of a user's experience regarding a particular interactive screen (e.g., if the user's saccadic movement increases after the user's point of gaze fixes on item 410, it may be determined that the user is confused by the total cost).

Figure 5:
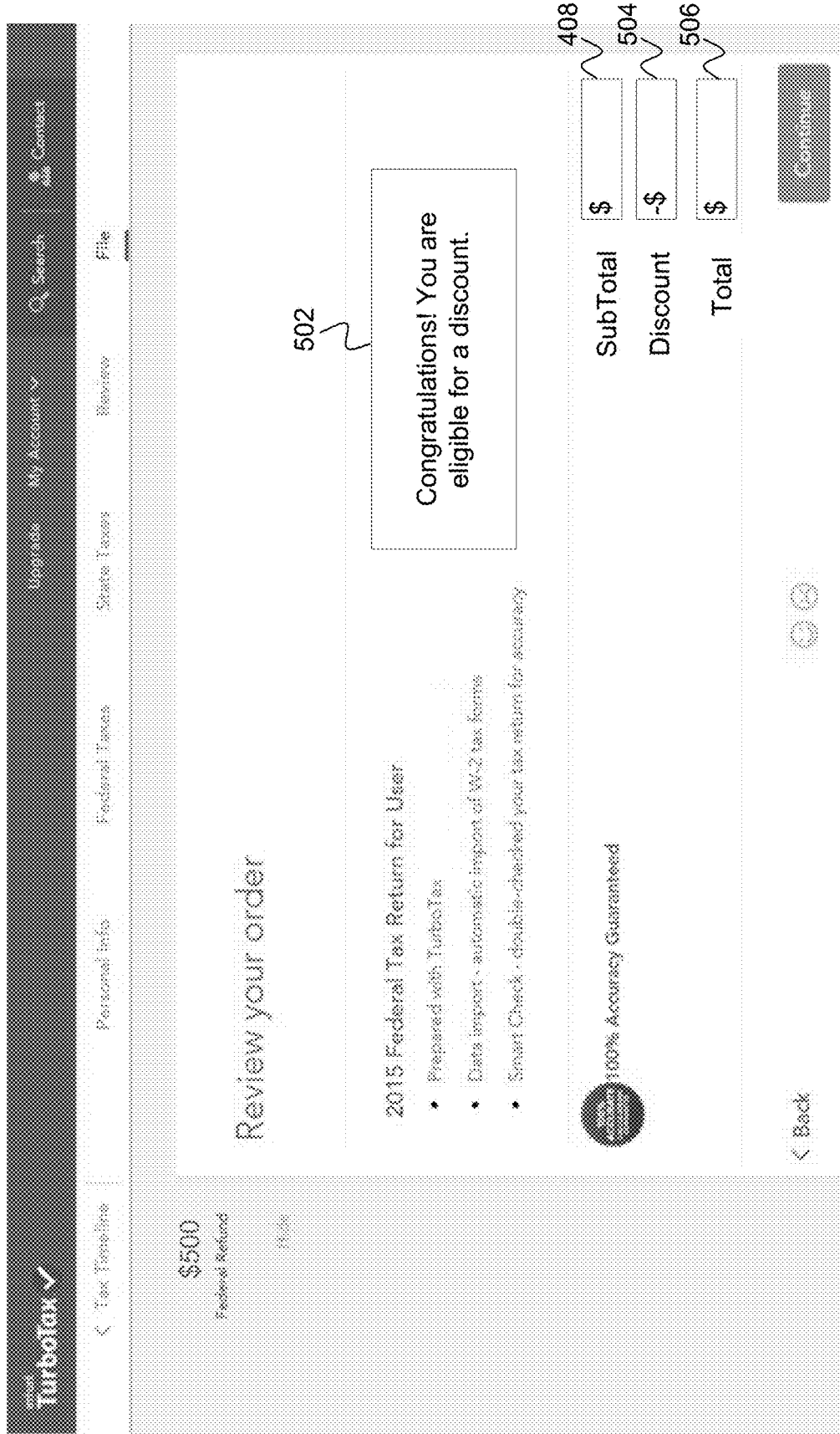
FIG. 5 illustrates an example intervention used to prevent the user from abandoning the interactive computing service, according to one embodiment.

As noted, in cases where the abandonment score does satisfy the predetermined condition, the software application may determine at least one intervention to use in order to reduce the likelihood of the user abandoning the application. FIG. 5 illustrates one example of an intervention that may be used by the software application in the event the application determines the user abandonment score is above a threshold. As shown, compared to the screen shown in FIG. 4, the software application may intervene by offering the user a discount via a pop-up message 502. The amount of the discount may be shown in box 504 and the updated total may be shown in box 506. Note, that while the above example in FIG. 5 illustrates an example of a real-time intervention, the software application can intervene when the user is off-line (e.g., not currently using the software application). For example, the software application can contact the user via e-mail, phone, or some other means to offer a coupon, discount, or other type of intervention.

Note that the interactive screens shown in FIG. 4 and FIG. 5 are provided herein as reference examples of the type of interfaces that may be presented to users. More generally, those of ordinary skill in the art will recognize that other types of interfaces and/or formats of information may be used as well.

Figure 6:
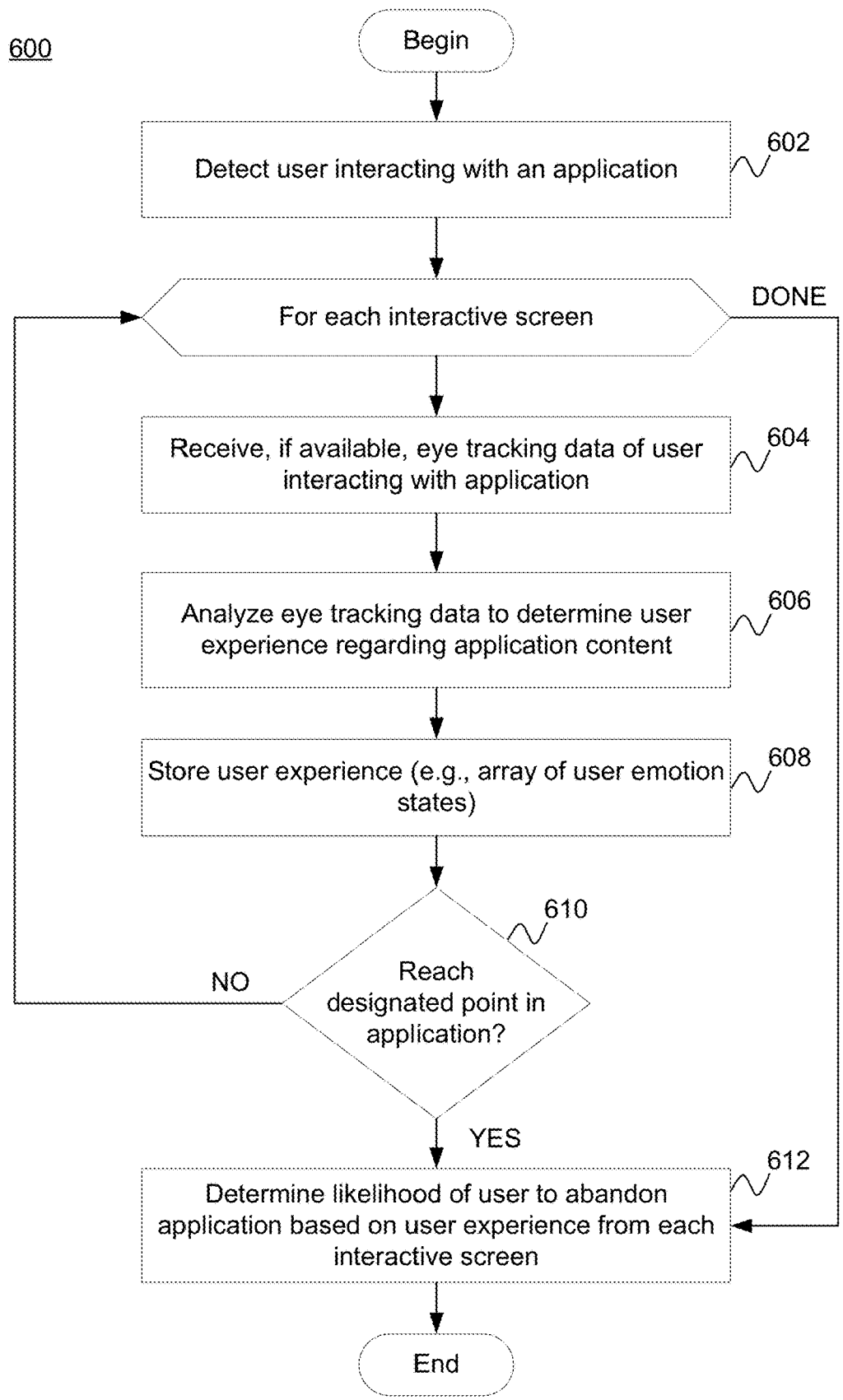
FIG. 6 illustrates a method for determining application experience of a user based on eye tracking data of the user, according to one embodiment.

FIG. 6 illustrates a method 600 for determining application experience of a user based on eye tracking data of the user, according to one embodiment. As shown, the method 600 begins at step 602, where the application (e.g., an online tax-preparation service) monitors (or detects) a user interacting with the application. For each interactive screen of the application, at 604, the application receives (if available) eye tracking data of the user captured using a camera associated with the user's device. At 606, the application analyzes the eye tracking data to determine an experience of the user regarding application content for the interactive screen. For example, the application may look for objective indicators of the user's emotional state, such as pupil dilation, point of gaze, and saccadic movement, in response to content displayed in the application. At 608, the application stores the user's experience (e.g., in a database, a user profile located in the database, etc.). As noted above, in some cases, the user's experience may be stored as an array of emotional states per interactive screen.

At 610, the application determines if the user has reached a designated point in the application (e.g., such as the print-file screen for a tax-preparation application). If not, the application proceeds to perform steps 604-610 for a different interactive screen visited by the user. On the other hand, if so, the application, at 612, determines a likelihood of the user to abandon the application based on user experience from each interactive screen. As noted above, the application may use a propensity model to determine the likelihood of the user to abandon the application. For example, such a model may be trained based on correlations between user actions (e.g., abandonment) at particular screens to the users' experience regarding one or more prior interactive screens of the application. In some embodiments, the application determines the likelihood of the user to abandon the application at any point during the user's interaction with the application (e.g., such as every screen that the user interacts with).

Figure 7:
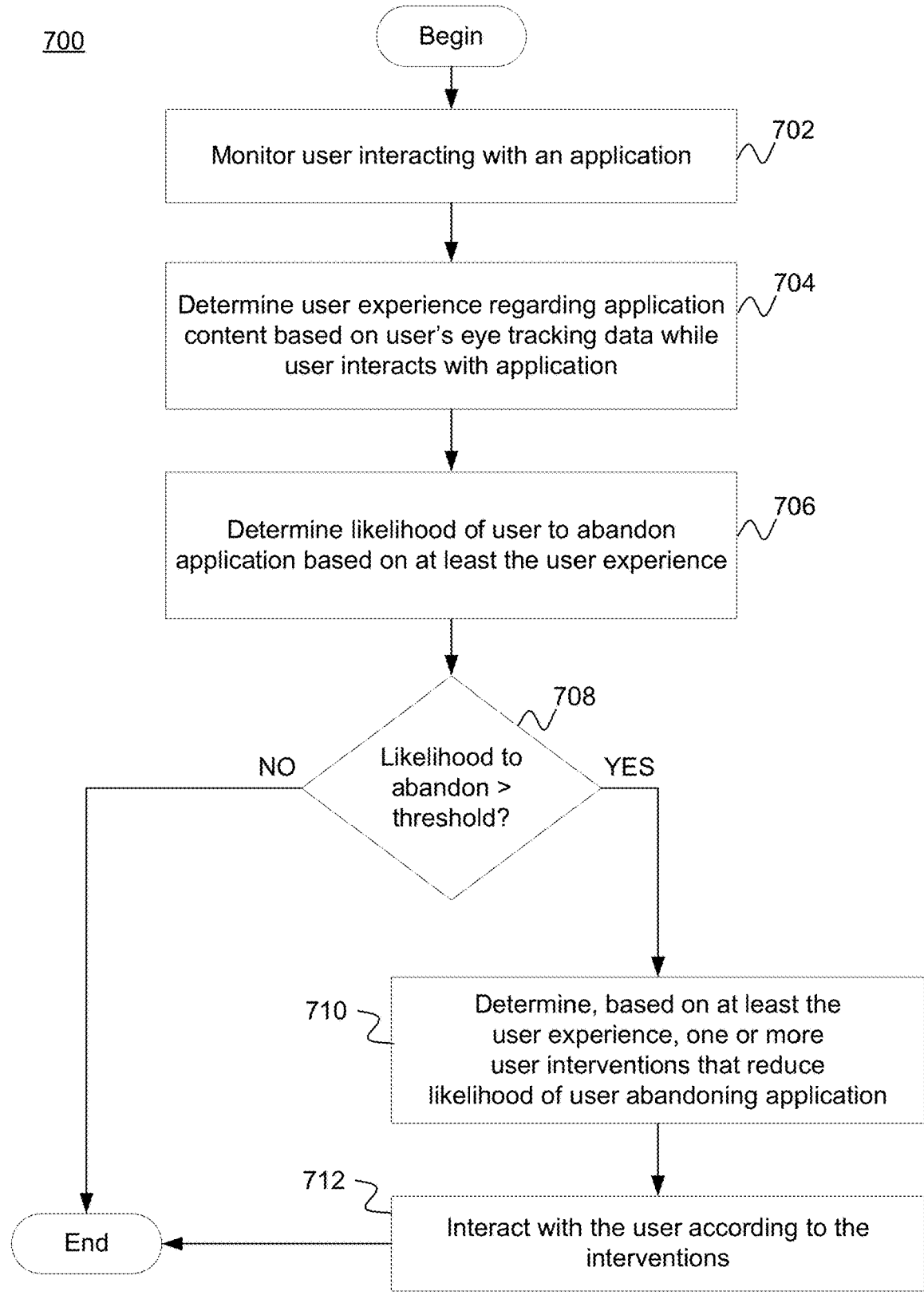
FIG. 7 illustrates a method for determining an intervention to prevent a user from abandoning the interactive computing service, according to one embodiment.

FIG. 7 illustrates a method 700 for determining one or more interventions for reducing likelihood of user abandonment, based on eye tracking data of a user, according to one embodiment. As shown, the method 700 begins at step 702, where the application (e.g., an online tax-preparation service) monitors (or detects) a user interacting with an application. At 704, the application determines the user's experience regarding application content based on the user's eye tracking data while the user interacts with the application (e.g., one or more predetermined interactive screens).

At 706, the application determines a likelihood of the user to abandon the application based on at least the user's experience (e.g., using a propensity model). At 708, the application determines whether the user's likelihood to abandon the application satisfies a predetermined condition (e.g., is above a threshold in this particular embodiment). If not, the method 700 ends (i.e., the application may choose not to intervene since the user is not at-risk of abandoning). On the other hand, the application, at 710, determines, based on at least the user experience, one or more user interventions that reduce the likelihood of the user abandoning the application. As noted above, such interventions can include, but are not limited to, offering a discount, offering assisted support, offering self-support content, providing direct links to information content, etc. In one embodiment, the application may use an uplift model to determine the type of interventions. For example, as noted, the uplift model may be trained based on correlations between interventions to users' at a particular page (given the users' experience for particular interactive screens) and the users' reaction to the interventions (e.g., based on eye tracking data). Once determined, the application, at 712, interacts with the user according to the interventions. For example, such interaction can be in real-time or when the user is off-line.

Figure 8:
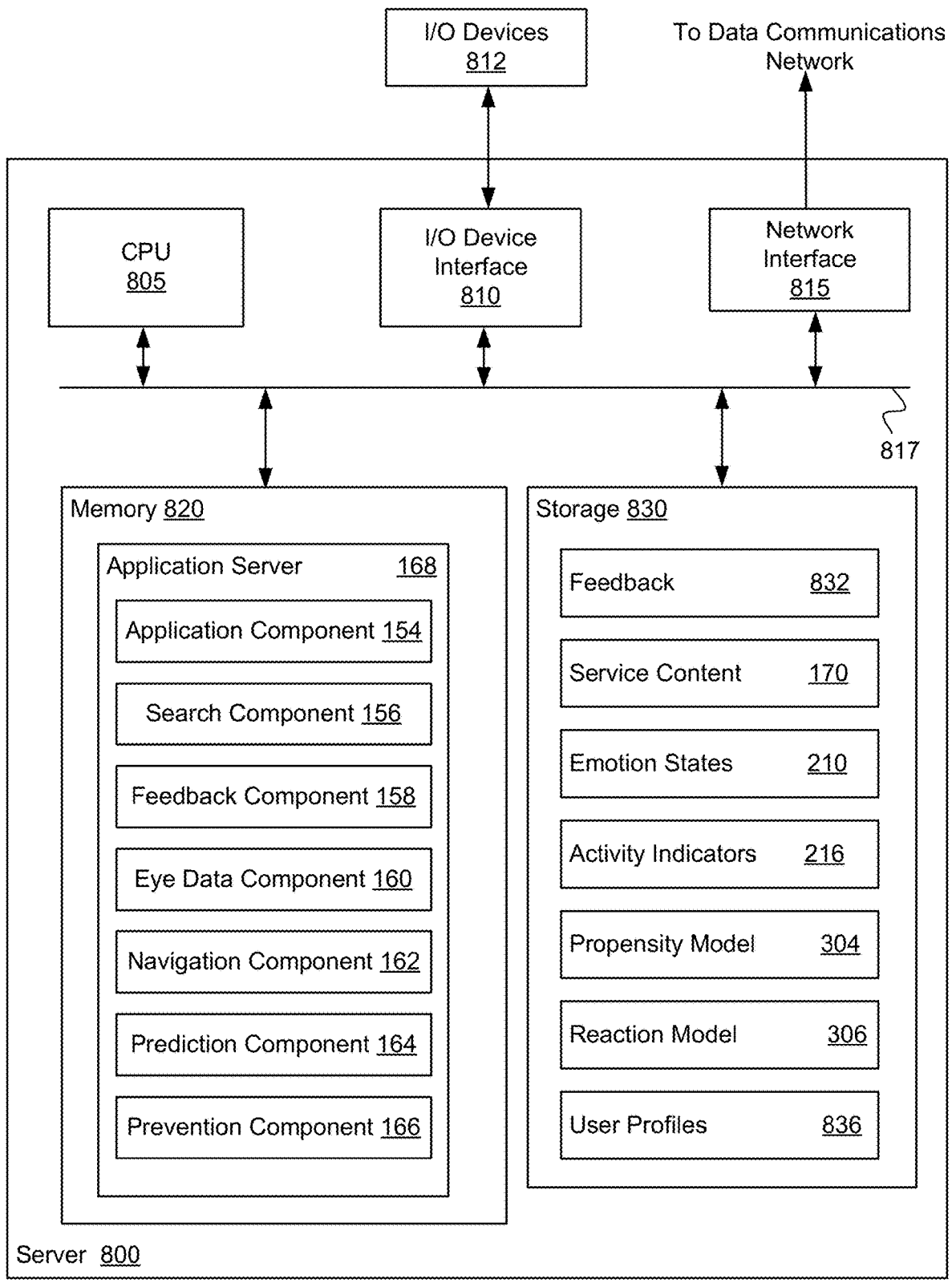
FIG. 8 illustrates an example computing system used to determine application experience of a user based on eye tracking data, according to one embodiment.

FIG. 8 illustrates an example computing system 800 used to determine application experience of a user based on paralinguistic information of the user, according to one embodiment.

As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, display and mouse devices) to the computing system 800. Further, the computing elements shown in computing system 800 may correspond to a physical computing system (e.g., a system in a data center) or may be a virtual computing instance executing within a computing cloud.

The CPU 805 retrieves and executes programming instructions stored in the memory 820 as well as stored in the storage 830. The bus 817 is used to transmit programming instructions and application data between the CPU 805, I/O device interface 810, storage 830, network interface 815, and memory 820. Note, CPU 805 is included to be representative of a single CPU, multiple CPUs, a single CPU having multiple processing cores, and the like, and the memory 820 is generally included to be representative of a random access memory. The storage 830 may be a disk drive or flash storage device. Although shown as a single unit, the storage 830 may be a combination of fixed and/or removable storage devices, such as fixed disc drives, removable memory cards, optical storage, network attached storage (NAS), or a storage area-network (SAN).

Illustratively, the memory 820 includes an application server 168, which includes an application component 154, search component 156, feedback component 158, eye data component 160, navigation component 162, prediction component 164, and prevention component 166, all of which are discussed in greater detail above. Further, storage 830 includes feedback 832, service content 170, emotion states 210, activity indicators 216, propensity model 304, reaction model 306 and user profiles 836.

Advantageously, the techniques presented herein allow an online service to track and determine user experience (based on eye tracking data) regarding different application content provided by the online service, and determine which users may be at risk of abandoning or discontinuing use of the online service. Additionally, the techniques presented herein can determine (based on eye tracking data) the set of interventions that can reduce the likelihood of the user abandoning the online service. As such, the techniques presented herein can be used to increase retention of customers.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for determining an application experience, comprising:
    determining, by a computing device, baseline eye tracking data of a user interacting with an application, the baseline eye tracking data comprising a baseline frequency of pupil dilations of the user;
    receiving, at the computing device, real-time eye tracking data of the user interacting with at least a first page of the application, the real-time eye tracking data comprising a real-time frequency of pupil dilations of the user;
    determining, by the computing device, based at least on the real-time eye tracking data and the baseline eye tracking data, a current user experience regarding the first page, wherein the current user experience comprises a level of interest with respect to at least a subset of the first page, and wherein the level of interest is determined based on a comparison between the real-time frequency of pupil dilations and the baseline frequency of pupil dilations;
    predicting, by the computing device, based on evaluating the current user experience, a user action;
    determining, by the computing device, based at least on the predicting, an intervention that changes a likelihood of the user action; and
    interacting, by the computing device, with the user according to the intervention.

2. The computer-implemented method of claim 1, wherein the baseline eye tracking data further comprises one or more of: point of gaze; saccadic eye movement duration; or saccadic eye movement patterns.

3. The computer-implemented method of claim 1, wherein the intervention is determined by using a model to evaluate the current user experience for the first page and the likelihood of the user action.

4. The computer-implemented method of claim 1, wherein the current user experience comprises one or more of: excitement, fixation, or fatigue.

5. The computer-implemented method of claim 1, wherein the intervention comprises at least one of: offering a discount, offering assisted support, offering self-support content, or providing a list of content items.

6. The computer-implemented method of claim 1, wherein interacting with the user according to the intervention comprises at least one of: a real-time intervention, an off-line intervention, presenting content items on an interface of the user, or altering at least one content item of the interface of the user.

7. The computer-implemented method of claim 1, wherein the current user experience relates to a particular item on the first page.

8. The computer-implemented method of claim 1, further comprising:
    determining at least one metric comprising one or more of:
        a count of user clicks for the first page;
        a total amount of time spent by the user on the first page;
        an age of the user;
        a gender of the user;
        an occupation of the user; or
        a location of the user; and
    evaluating the at least one metric in addition to the current user experience, using a model, to determine the likelihood of the user action.

9. A system for determining an application experience, comprising:
    one or more processors; and
    a memory comprising instructions that, when executed by the one or more processors, cause the system to:
        determine, by a computing device, baseline eye tracking data of a user interacting with an application, the baseline eye tracking data comprising a baseline frequency of pupil dilations of the user;
        receive, at the computing device, real-time eye tracking data of the user interacting with at least a first page of the application, the real-time eye tracking data comprising a real-time frequency of pupil dilations of the user;
        determine, by the computing device, based at least on the real-time eye tracking data and the baseline eye tracking data, a current user experience regarding the first page, wherein the current user experience comprises a level of interest with respect to at least a subset of the first page, and wherein the level of interest is determined based on a comparison between the real-time frequency of pupil dilations and the baseline frequency of pupil dilations;
        predict, by the computing device, based on evaluating the current user experience, a user action;
        determine, by the computing device, based at least on the user action that was predicted, an intervention that changes a likelihood of the user action; and
        interact, by the computing device, with the user according to the intervention.

10. The system of claim 9, wherein the baseline eye tracking data further comprises one or more of: point of gaze; saccadic eye movement duration; or saccadic eye movement patterns.

11. The system of claim 9, wherein the intervention is determined by using a model to evaluate the current user experience for the first page and the likelihood of the user action.

12. The system of claim 9, wherein the current user experience comprises one or more of: excitement, fixation, or fatigue.

13. The system of claim 9, wherein the intervention comprises at least one of: offering a discount, offering assisted support, offering self-support content, or providing a list of content items.

14. The system of claim 9, wherein interacting with the user according to the intervention comprises at least one of: a real-time intervention, an off-line intervention, presenting content items on an interface of the user, or altering at least one content item of the interface of the user.

15. The system of claim 9, wherein the current user experience comprises relates to a particular item on the first page.

16. The system of claim 9, wherein the instructions, when executed by the one or more processors, further cause the system to:
- determine at least one metric comprising one or more of:
  - a count of user clicks for the first page;
  - a total amount of time spent by the user on the first page;
  - an age of the user;
  - a gender of the user;
  - an occupation of the user; or
  - a location of the user; and
- evaluate the at least one metric in addition to the current user experience, using a model, to determine the likelihood of the user action.

17. A computer-implemented method for determining an application experience, comprising:
- determining, by a computing device, baseline eye tracking data of a user interacting with an application, the baseline eye tracking data comprising a baseline frequency of pupil dilations of the user;
- receiving, at the computing device, real-time eye tracking data of the user interacting with at least a first page of the application, the real-time eye tracking data comprising a real-time frequency of pupil dilations of the user;
- determining, by the computing device, based at least on the real-time eye tracking data and the baseline eye tracking data, a current user experience regarding the first page, wherein the current user experience comprises a numerical score indicating a level of interest with respect to at least a subset of the first page, and wherein the numerical score is determined based on a comparison between the real-time frequency of pupil dilations and the baseline frequency of pupil dilations;
- predicting, by the computing device, based on evaluating the current user experience, a user action;
- determining, by the computing device, based at least on the predicting, a type of intervention that changes a likelihood of the user action; and
- interacting, by the computing device, with the user according to the type of intervention.

18. The computer-implemented method of claim 17, wherein the baseline eye tracking data further comprises one or more of: point of gaze; saccadic eye movement duration; or saccadic eye movement patterns.

19. The computer-implemented method of claim 17, wherein the type of intervention is determined by using a model to evaluate the current user experience for the first page and the likelihood of the user action.

20. The computer-implemented method of claim 17, wherein the current user experience comprises one or more of: excitement, fixation, or fatigue.

* * * * *